United States Patent

Leiner et al.

[15] 3,640,150
[45] Feb. 8, 1972

[54] POWER DRIVEN ACTUATOR OF THE COMPOUND PLANETARY GEAR TYPE

[72] Inventors: Robert L. Leiner, Pompton Lakes; Salvatore Avena, Newark, both of N.J.

[73] Assignee: Curtiss-Wright Corporation

[22] Filed: June 25, 1970

[21] Appl. No.: 49,657

[52] U.S. Cl. ...............................74/674, 74/89.16, 74/768, 74/801
[51] Int. Cl. ......................................F16h 19/00, F16h 1/32
[58] Field of Search ...............74/803, 801, 665 K, 674, 768, 74/665 F, 665 H, 665 S

[56] References Cited

UNITED STATES PATENTS

| 3,304,804 | 2/1967 | Oldfield et al. | 74/665 K |
| 1,431,167 | 10/1922 | McCollum | 74/801 |
| 2,966,808 | 1/1961 | Grudin | 74/801 X |
| 1,323,245 | 12/1919 | Borkes | 74/801 |
| 2,944,444 | 7/1960 | Burns | 74/801 |
| 3,008,355 | 11/1961 | Grudin | 74/801 |
| 3,203,275 | 8/1965 | Hoover | 74/801 X |

Primary Examiner—Carlton R. Croyle
Assistant Examiner—Thomas C. Perry
Attorney—Arthur L. Frederick and Victor D. Behn

[57] ABSTRACT

A power driven actuator of the compound planetary gear type which has two output members capable of movement relative to each other and to a fixed reference point through a combined arcuate distance of up to 360° for pivotally moving a member to be actuated via a crank linkage system interconnecting the output members and the member to be actuated.

5 Claims, 6 Drawing Figures

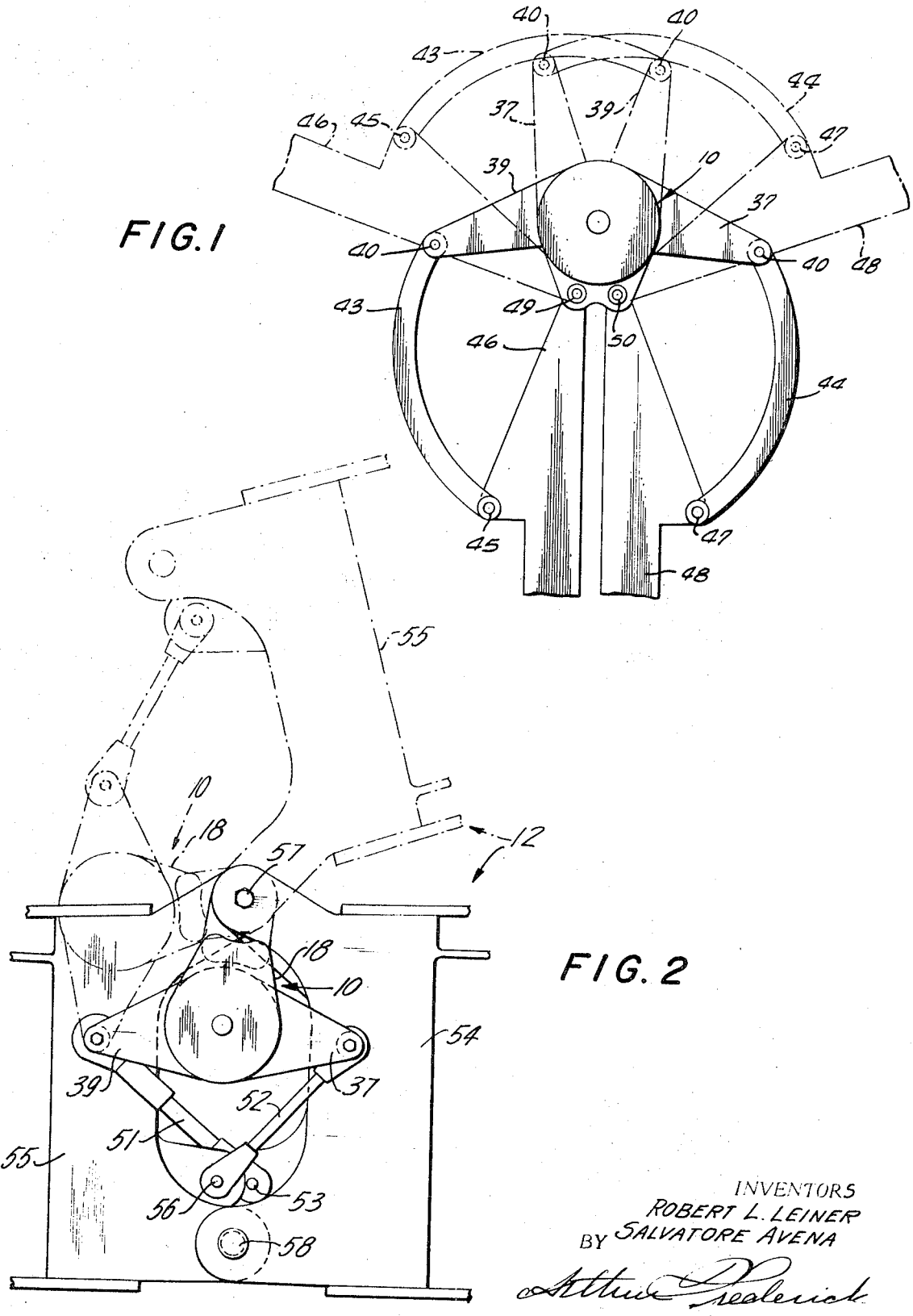

INVENTORS.
ROBERT L. LEINER
BY SALVATORE AVENA

ATTORNEY

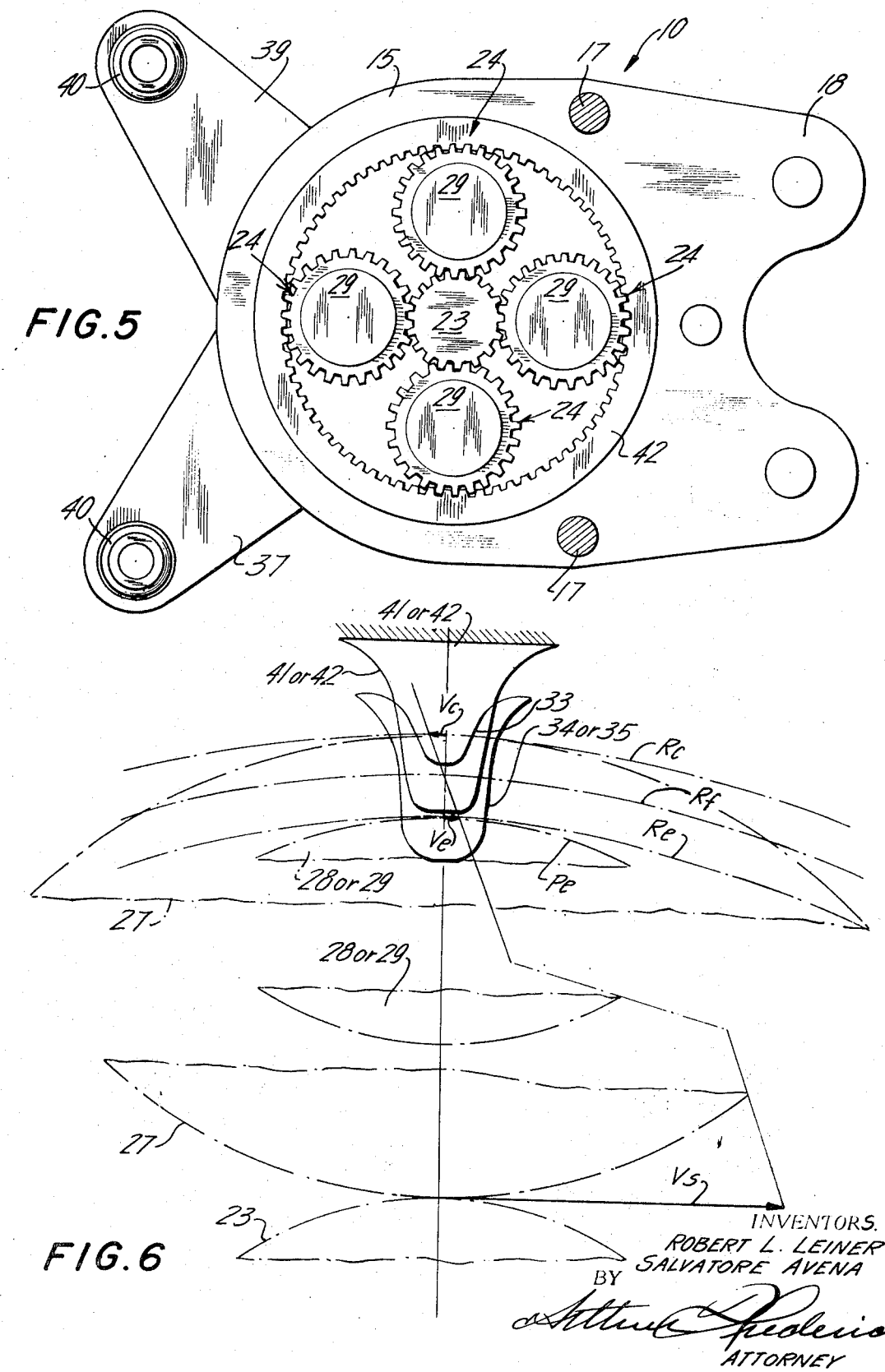

3,640,150

1

POWER DRIVEN ACTUATOR OF THE COMPOUND PLANETARY GEAR TYPE

DISCLOSURE

This invention relates to power driven actuators and, more particularly, to rotary or oscillatory power transmission mechanisms of the type suitable for the actuation of hinged elements or components, such as aircraft wing segments, flaps, wheel well doors, and the like.

BACKGROUND OF THE INVENTION

In power driven actuators or compound planetary transmission mechanisms, such as exemplified in the United States Patent to Grudin, U.S. Pat. No. 3,008,355, wherein compound planetary gearing provides for rotatively driving an annular output member relative to a fixed housing, such mechanisms when employed to actuate a crank-type linkage connection cannot provide an arcuate drive of more than 180° to a member to be actuated. Thus, heretofore known planetary power actuators have limited drive movement capabilities in applications where it is connected through crank-type linkage systems to the member to be actuated. Another disadvantage of conventional planetary power actuators is their large size and weight requirements due to the high torque required by their limited stroke. Obviously, this weight-to-load capacity is of major importance in aircraft usages where weight and size of aircraft components are critical design factors. Accordingly, the present invention is directed to an improved compound planetary transmission mechanism which is relatively small, light in weight and capable of an effective arcuate output drive movement of up to 360° to pivotally actuate, through crank linkage means, a member to be actuated.

It is therefore an object of this invention to provide a power driven actuator of the compound planetary gear type which is relatively light in weight and small in size and has a high output torque capacity.

It is another object of the present invention to provide a power driven actuator of the compound planetary gear type which is capable of an effective or combined rotative output drive movement of up to 360° to achieve pivotal movement of a member to be actuated.

It is a feature of this invention to provide, in the power driven actuator of the compound planetary gear type, two annular output members rotatable relative to each other and to a fixed or stationary reference point through an effective or combined arcuate movement of up to 360° to move a member to be actuated via crank-linkage-type interconnection. This feature provides a power driven actuator having high torque capacity, but of relatively small size. For example, the work or energy (W) to pivotally move a member is the product of the torque (T) and distance ($\theta$) or as expressed in the equation, $W=T\times\theta$. By transposing this formula, it can be seen that the torque force (T) is computed from the formula $T=W/\theta$; thus, as the angular driving movement increases, the torque force decreases. Therefore, by providing two output members capable of driving through an effective total arc of up to 360° the size of the actuating assembly can be made smaller to carry the lesser torque load.

SUMMARY OF THE INVENTION

The present invention, therefore, contemplates a novel power driven actuator of the compound planetary gear type comprising an input sun gear supported for rotation within a housing and in mesh with a plurality of compound planetary gear members. Each compound planetary gear member consists of at least two gear portions having pitch circles of different diameters, one gear portion being in mesh with the sun gear and a first annular output ring gear, while the other gear portion meshes with a second annular ring gear. Each of the first and the second annular output ring gears carry an output member; as for example, a lever arm, which is connected through suitable linkage means to a member to be pivotally actuated. The geometry of the gearing and the assembly is such that the first and second annular output ring gears are capable of moving through a combined arcuate movement of a maximum of 360° to achieve actuation of a member to be actuated through a maximum of 180°To provide a point of reaction and synchronization of the movement of the first and second annular output ring gears in opposite directions and relative to a fixed reference point, each of the planetary gear members is in mesh with a stationary ring gear fixedly secured in the housing and having a pitch circle of a diameter intermediate of the different pitch circles of the two gear portions of the planetary gear members. In an alternative embodiment, each of the planetary gear members is provided with a third gear portion having a pitch circle diameter intermediate of the different pitch diameters of the two planetary gear portions, the third gear portion being arranged in proper meshing relationship with the stationary ring gear which is fixedly secured to the housing. The advantage of the first mentioned embodiment wherein the gear geometry provides for the teeth of the stationary ring gear to contact the addendum portions of the teeth of the smaller of the two planetary gear portions, is that there is no need for another intermediate gear portion in each planetary gear member, as called for in the aforesaid alternative embodiment, thus further contributing to the small size, structural simplification and inexpensiveness of the power driven actuator of this invention. The other contributing feature which provides, according to the present invention, a power driven actuator of relative light weight and small size is the cooperative function of two output gear members providing a combined arcuate output movement of up to 360° so that the total torque load is less than it would be on such devices heretofore known in the art.

DESCRIPTION OF THE DRAWINGS

The invention will be more fully understood from the following description when considered in connection with the accompanying drawings in which:

FIG. 1 is a schematic end elevational view of the power driven actuator according to this invention as applied to the actuation of a two section closure assembly;

FIG. 2 is a schematic view similar to FIG. 1 showing the application of the power driven actuator to folding and unfolding a wing;

FIG. 5 is a transverse sectional view taken substantially along line 5—5 of FIG. 4;

FIG. 6 is a schematic illustration showing the location of the pitch circles of the output members, the fixed, synchronizing ring gears, sun gear and the forces acting thereon.

PREFERRED EMBODIMENT OF THE INVENTION

Figure 3:
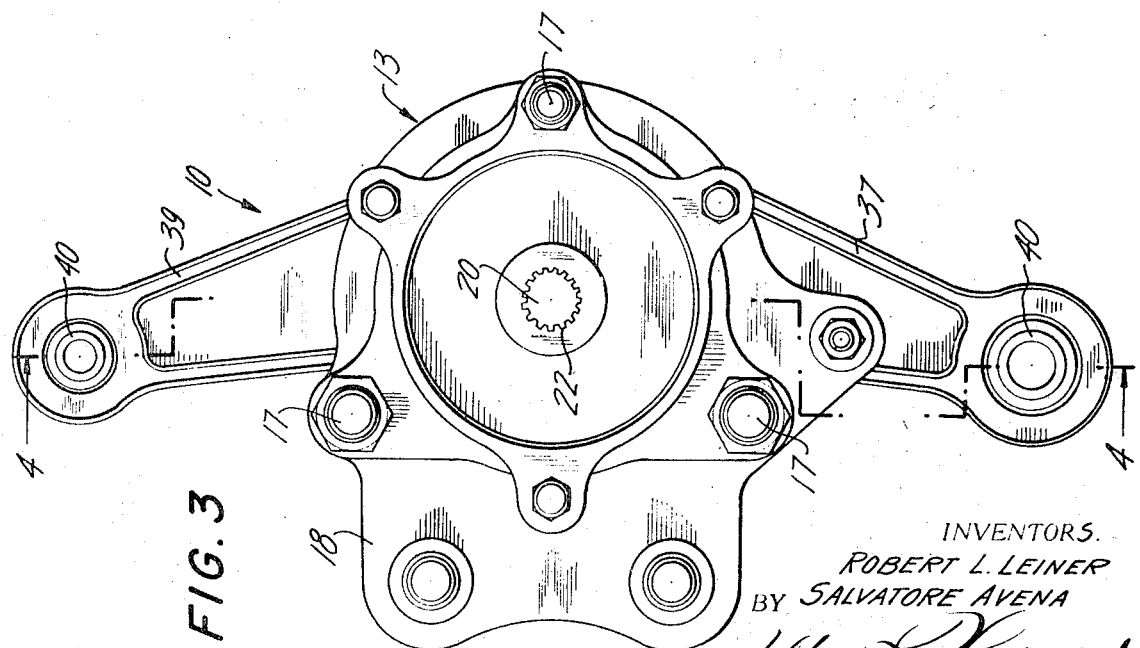
FIG. 3 is an end elevational view of the power driven actuator on an enlarged scale.

Now, referring to the drawings and more particularly to FIGS. 1, 2 and 3, the reference numeral 10 generally refers to the power driven actuator according to this invention. In FIG. 1, the power driven actuator 10 is shown connected to move a two section closure assembly 11, while in FIG. 2 the power driven actuator 10 is illustrated as connected to fold an aircraft wing 12. It is to be understood that the present invention is not limited in applications to those shown in FIGS. 1 and 2, but has many other applications within the purview of the scope and spirit of the present invention. Also, while only one power driven actuator 10 is shown, the invention is not limited in application to the use of a single actuator, but may employ a plurality of power driven actuators arranged parallel to each other to effect actuation of an element.

Figure 4:
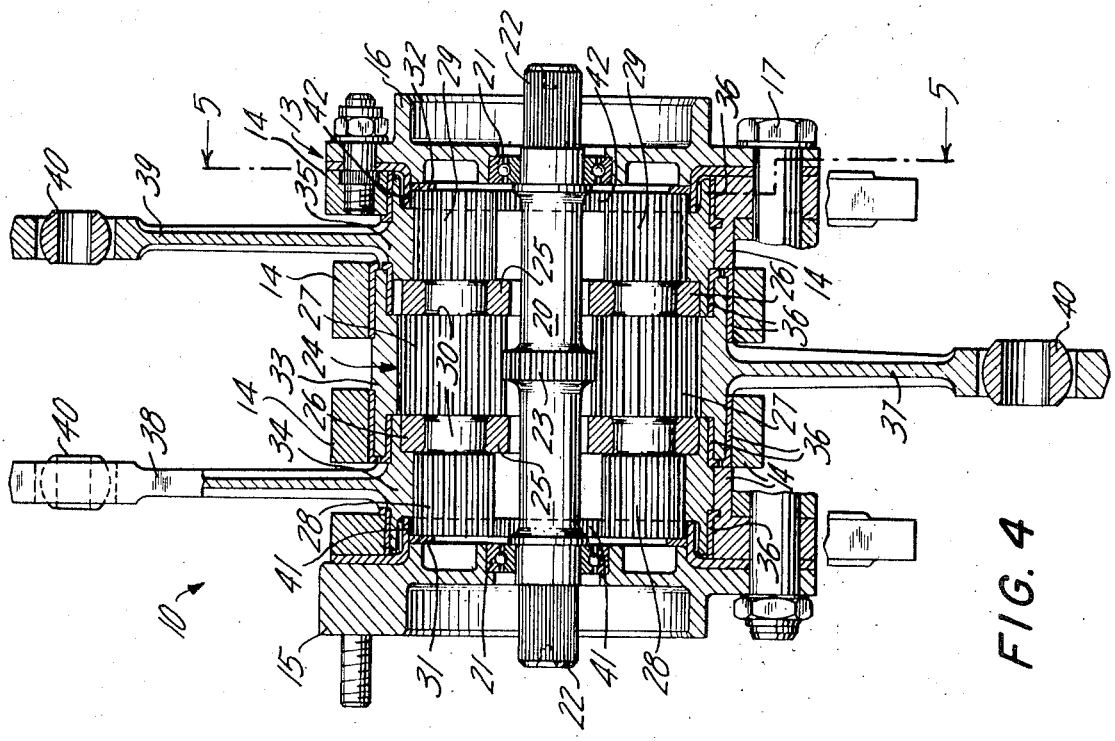
FIG. 4 is a longitudinal cross-sectional view taken substantially along line 4—4 of FIG. 3.

As best shown in FIGS. 3, 4 and 5, power driven actuator 10 has a cylindrical casing or housing 13 comprising a plurality of ring shaped sections 14 clamped together between end walls 15 and 16 by a plurality of circumferentially spaced, longitudinally extending tie bolts 17. As shown in FIG. 3, end wall 15 has a flange portion 18 by which actuator 10 can be mounted on a structure and about which the sections of closure member 11 may be pivotally secured (see FIG. 1). Of course, as shown in FIG. 2, flange portion 18 is unnecessary since the power driven actuator 10 must be free to move through an arcuate path as the aircraft wing is actuated to a folded and unfolded position. A drive shaft 20 is journaled for rotation in housing 13 by bearings 21 disposed in end walls 15 and 16. The drive shaft 20 is provided with splined end portions 22 for connection with a source of rotary power (not shown), such as electric or fluid motors, through universal joints and/or brake mechanisms (not shown). The shaft 18 has a sun gear 23 which is formed integrally with the shaft or may be a separate element secured to the latter for conjoined rotation with the shaft. A plurality of circumferentially spaced compound planetary gears 24 are supported in mesh with and concentrically to sun gear 23 by two sets of concentrically spaced rings 25 and 26.

As best shown in FIGS. 4 and 5, each compound planetary gear 24 comprises a central pinion gear 27 and two similar end pinion gears 28 and 29 which are of similar pitch circle diameter than pinion gear 27. The gears 28 and 29 of each planetary gear 24 are symmetrically arranged on opposite sides of gear 27 so that the loading of each planetary gear member 24 is balanced. The central pinion gear 27 is separated from end pinion gears 28 and 29 by a groove 30 in which rings 25 and 26 of each set of rings ride. Endwise axial movement of planetary gear 24 within housing 13 is limited by spacer rings 31 and 32 adjacent end walls 15 and 16, respectively. The planetary gears 24 along with rings 28 and 29 are self-supporting in operation and, therefore, no additional supporting structure or caging mechanism is needed. This feature contributes to the simplicity and compactness of the entire assembly of power driven actuator 10. The planetary gear members 24 in addition to meshing with sun gear 23, mesh with annular output ring gears 33, 34 and 35.

As best shown in FIG. 4, ring gears 34 and 35 adjacent end walls 15 and 16, respectively, are supported by housing sections 14 while ring gear 33 is supported for rotation on housing sections 14 and in partial overlapping relationship to ring gears 35 and 34. To provide a self-lubricating bearing surface between ring gears 33, 34 and 35 and housing sections 14 and between the overlapping surfaces of the ring gears, annular sleeves 36 of tetrafluoroethylene or other material having relatively high wear strength and self-lubricating characteristics are disposed between those adjacent surfaces. Each of the ring gears 33, 34, and 35 carry an output arm 37, 38, and 39, respectively, which arms may be formed integrally with its associated ring gear, as shown, or be a separate member suitably secured to the associated ring gear. Each output arm 37, 38, and 39 may have a ball and socket joint 40 at the distal end thereof for connection to suitable motion transmitting linkages as hereinafter more fully explained.

In order to provide synchronized movement of output ring gears 34 and 35 with output ring gear 33 and provide a reaction force or resistance to the rotation of output ring gears 34 and 35, a pair of fixed or stationary ring gears 41 and 42 are secured to the housing adjacent end walls 15 and 16, respectively, and in meshing relationship with pinion gears 28 and 29 of planetary gear members 24. As best illustrated in FIG. 6, each of the fixed ring gears 41 and 42 are dimensioned to have a pitch circle, $R_f$, having a diameter which is intermediate to the diameters of pitch circles, $R_c$ and $R_e$, of output ring gear 33 and output ring gears 34 or 35, respectively. This gear geometry provides for the transmission of force from sun gear 23, as represented by vector, $V_s$, to central pinion gears 27, which force is translated, through fixed ring gears 40 and 41, into two force components acting in opposite directions as presented by vectors $V_c$ and $V_e$. Thus, compound planetary gears 24 effect rotative movement of output ring gears 34 and 35 in a direction opposite to and simultaneously with movement of ring gear 33. As shown in FIGS. 4 and 5, the rotation of output ring gears 33, 34 and 35 provides for rotative movement of output arms 38 and 39 toward or away from output arm 37, depending upon the direction of rotation of sun gear 23. The fixed ring gears 41 and 42 not only achieve coordinated movement of output ring gears 34 and 35 relative to output ring gear 33, but it also orientates such relative movement to a fixed reference point, namely housing 13. In an alternative embodiment of this invention (not shown), it is contemplated without departing from the scope and spirit of this invention, to substitute for the engagement of pinion gears 28 and 29 with fixed ring gears 41 and 42 in a "bastard" meshing relationship two additional pinion gear portions (not shown) each of which has a pitch circle diameter intermediate those of pinion gears 28, 29 and 27 and arranged to properly mesh with ring gears 41 and 42 at their pitch circles.

In the first mentioned embodiment, the provision of dimensioning fixed ring gears 41 and 42 to mesh with their associated pinion gears 28 and 29 at a point outside the pitch circle, $P_e$, of the pinion gears or in the addendum portion of the pinion gear teeth, a third intermediate sized gear on the compound planetary gear assembly 24, as contemplated in the aforementioned alternative embodiment, is obviated. Thus, the work of fabrication is reduced as well as minimizing the weight and size of the power driven actuator 10.

In one application of power driven actuator 10, as illustrated in FIG. 1, output arms 38 and 39 of output ring gears 34 and 35 are connected at their ball and socket joints 40 to a pair of arcuate-shaped arms or links 43, while output arm 37 is pivotally connected, at its ball and socket joint 40, to an arcuate-shaped arm or link 44. The opposite end portion of links 43 are joined at pivot connections 45 (only one of which is shown in FIG. 1) to a door section 46 of closure assembly 11. The end of link 44, opposite from ball and socket joint 40, is pivotally joined, at 47, to another door section 48 of closure assembly 11. The door section 46 is pivotally supported on a shaft 49, while door section 48 is hingedly supported on a shaft 50 which extends parallel to shaft 49. The shafts 49 and 50 also serve to support the power driven actuator 10. Obviously, in this application, power driven actuator 10 need not be mounted on shafts 49 and 50 or in alignment with such shafts, but may be secured by mounting bolts (not shown) extending out of alignment with shafts 49 and 50 to a frame or support structure (not shown).

In operation of the power driven actuator 10 as applied in FIG. 1 to effect closing of door 11 by movement of door sections 46 and 48 to the full closed position shown in broken lines, drive shaft 22 (FIG. 4) is driven by a suitable rotary power means (not shown) which, in turn, rotates sun gear 23. Rotation of sun gear 23 effects planetary movement of compound planetary gears 24 so as to cause output ring gears 34 and 35 to rotate in unison in one direction and output ring gear 33 in the opposite direction. As viewed in FIG. 1, arms 38 and 39 (only one of which is shown in FIG. 1) is rotated in clockwise direction while arm 37 is simultaneously rotated in a counterclockwise direction. The clockwise rotation of arms 38 and 39 forces door section 46, through link 43, to pivot about shaft 49 in a clockwise direction. Simultaneously, the counterclockwise rotation of arm 37 forces door section 48, through link 44, to pivot about shaft 50 in a counterclockwise direction. It can be readily seen that to fully open closure assembly 11, door sections 46 and 48 are moved through arcs of more than 90° each as do output arms 37, 38, 39 through their associated output ring gears. Thus, the output means of power driven actuator 10 moves through an effective arcuate distance of about 240° to achieve a closure assembly movement. Since the distance traversed by the output ring gears and their associated arms is substantially more than 180°, the torque load on power driven actuator 10 is considerably less than it would be if output movement was only 180° as is evident from the following formula:

$$T = W/\theta$$

where

T is torque load
W is work
$\theta$ is distance.

In view of the substantially reduced torque load imposed on power driven actuator 10, it can be made smaller, lighter in weight and more compact than heretofore known power driven actuators or hinge mechanisms.

In another application of power driven actuator 10, as shown in FIG. 2, where the power driven actuator is employed to fold and unfold a wing 12, output arms 38 and 39 of output ring gears 34 and 35 are pivotally connected to links 51 (only one of which is shown in FIG. 2), while output arm 37 of output ring gear 33 is connected to a link 52. Links 51 are pivotally connected at 53 to a fixed section 54 of wing 12 while link 52 is pivotally joined to movable section 55 of wing 12 at 56. The wing sections 54 and 55 are pivotally connected together at hinge connection 57 and locked together in the unfolded position by a removable locking pin 58. The housing 13 of power driven actuator 10 is free floating and is supported solely by output arms 33, 34, and 35 so that the power driven actuator 10 can swing about hinge connection 57.

In operation of the power driven actuator 10, as in its operation as applied in FIG. 1, the output ring gears 33, 34 and 35 and their associated arms 37, 38 and 39 rotate through an arcuate distance considerably in excess of 180°, as for example about 200°, to effect movement of wing section 54 about hinge connection 56 a distance of about 170°. As stated before with respect to the application shown in FIG. 1, the torque load imposed on power driven actuator 10 is less than heretofore power driven actuators wherein the output members thereof only travel through a distance of about 180° since the effective distance of travel of the output members of the present invention is substantially in excess of 180°.

It is believed now readily apparent that a novel power driven actuator of the compound planetary gear type has been disclosed that is small in size in relation to torque load capacity, relatively simple and compact in construction and is capable of actuating a member to be actuated through a crank linkage system.

Although but one embodiment of the invention has been illustrated and described in detail, it is to be expressly understood that the invention is not limited thereto. Various changes can be made in the arrangement of parts without departing from the spirit and scope of the invention as the same will not be understood by those skilled in the art.

What is claimed is:

1. A power driven actuator of the compound planetary gear type for actuating a member through a push-pull linkage, the actuator comprising:
   a. coaxially arranged rotatable ring gears connected to said linkage;
   b. a plurality of planet members spaced circumferentially with respect to said rotatable ring gears;
   c. each planet member comprising a central pinion gear portion and end pinion gear portions on opposite sides of the central pinion gear and having pitch circles of diameters different in size from that of said central pinion gear portion;
   d. each of the planet members being disposed so that the central pinion gear portion and the end pinion gear portions mesh with said rotatable ring gears to rotate the latter;
   e. drive means for causing said planet members to planetate; and
   f. a pair of fixed ring gears disposed with one fixed ring gear in meshing relationship with each of the end pinion gears on one side of the central pinion gear and the other fixed ring gear in meshing relationship with each of the end pinion gears on the other side of the central pinion gear;
   g. said rotatable ring gears having different size pitch circles and each of said fixed ring gears having a pitch circle of a size intermediate the diameters of the pitch circles of the rotatable ring gears so that said rotatable ring gears are rotated in directions opposite to each other.

2. A power driven actuator of the compound planetary gear type for actuating a member through a push-pull linkage, the actuator comprising:
   a. a housing;
   b. a drive shaft journaled in said housing and connected to a source of rotary power;
   c. a sun gear in said housing rotated by said drive shaft;
   d. a plurality of planetary gears;
   e. each planetary gear having;
      1. a central gear portion;
      2. an end gear portion on opposite sides of said central gear portion;
      3. said end gear portion having pitch circles of smaller diameters than the diameter of the pitch circle of said central gear portion;
   f. the central gear portion of each planetary gear being disposed in meshing relationship to the sun gear to be driven by the latter;
   g. a first annular output ring gear means supported for rotation in said housing and in meshing relationship with said central gear to be driven by the latter;
   h. a pair of second annular output ring gears means supported for rotation in said housing with one of each disposed in meshing relationship with one of the end gear portions of the planetary gear; and
   i. at least one fixed ring gear secured to said housing and having a pitch circle intermediate in size between the pitch circles of the first and second output ring gears means and disposed in mesh with one of the end gear portions in the addendum area of the gear teeth of the latter to thereby effect rotation of said first and second ring gear means in opposite directions and relative to the housing.

3. The mechanism of claim 2, wherein each of said first and second ring gear means includes an arm which is pivotally connected at its distal end portion of the push-pull linkage to effect actuation of a pivotally mounted member.

4. The mechanism of claim 2, wherein said housing is pivotally secured to a fixed structure.

5. The mechanism of claim 2, wherein a fixed ring gear is secured at opposite ends of the housing with each fixed ring gear in mesh with one of the end gear portions in the addendum area of the gear teeth of the latter.

* * * * *